United States Patent [19]
Capulli et al.

[11] 3,884,653
[45] May 20, 1975

[54] SYSTEM FOR PURIFICATION OF GASES

[76] Inventors: Giuseppe Capulli, Rua General Cristovao Barcelos, 180, Apt. 102, Laranjeiras; Gasparino Jose DeSant, Rua Aristides Espinola, Leblon, Apt. 304, Guanabara; Theodoro DeCarvalho, Rua Hilario de Gouveia No. 30, Apt. 402, Guanabara; Helio Marcos Penna Beltrao, Rua Prudente de Morais, No. 1.179, last floor, Guanabara, all of Brazil

[22] Filed: July 27, 1973

[21] Appl. No.: 383,079

[52] U.S. Cl. ............ 55/223; 55/229; 55/256; 55/257; 261/29; 261/121 R
[51] Int. Cl. ............................................. B01d 47/02
[58] Field of Search ............ 55/223, 229, 256, 257, 55/244, 245; 261/29, 36 R, 76, 121 R

[56] References Cited
UNITED STATES PATENTS

| | | | |
|---|---|---|---|
| 809,383 | 1/1906 | Lowe | 55/244 X |
| 2,161,122 | 6/1939 | Anderson | 55/223 X |
| 2,200,891 | 5/1940 | Nyborg | 55/223 |
| 2,484,277 | 10/1949 | Fisher | 55/223 |
| 3,392,968 | 7/1968 | Wollmann | 261/121 A |
| 3,520,113 | 7/1970 | Stokes | 261/121 A X |

*Primary Examiner*—Frank W. Lutter
*Assistant Examiner*—William Cuchlinski, Jr.

[57] ABSTRACT

An apparatus and system for the purification of residual gases, such as flue and exhaust gases which may contain soot, is provided wherein the gases to be purified are sucked into a chamber, treated with liquid, e.g., an aqueous liquid, in the chamber whereupon condensation of vapors within the gases is initiated, mix of the gas and liquid being passed through a Venturi type constriction and thence to an enclosed space above a first tank which surrounds the chamber where the liquid and solid components separate from the gas. The heavier solid components settle to the bottom of the liquid in the first tank from which liquid may be withdrawn. The gases separating in the space above the first tank build up a pressure and are passed below the surface of a liquid in a second tank whereupon they are further purified and on escaping from the second tank are released to the atmosphere. Means are provided for forced circulation of the liquid to the chamber and for adding makeup liquid.

4 Claims, 2 Drawing Figures the apparatus: the entrance 18 is for liquid to be distributed through duct 19 to supply tank 8 passing through valve 20. Tank 8 is emptied through valve 26 and is cleaned internally by opening valve 21 to allow liquid to be sprayed from nozzle 23. Tank 10 is filled up through valve 22. Valves 24 and 25 maintain the liquid level inside tanks 8 and 10. Valve 26 is to empty tank 8 and valve 27 is to empty tank 10; in both cases liquid passes through the discharging duct 28.

SYSTEM FOR PURIFICATION OF GASES

This invention relates to a system or apparatus for eliminating impurities, including soot, from residual gases coming from furnaces, incinerators, and other sources.

Among the objects of the invention is to provide an improved system for the elimination of impurities, including soot from such gases as flue gases and exhaust gases.

SHORT DESCRIPTION OF THE INVENTION

The objects of the invention are attained by sucking the gas into a first circulating liquid system which wets the soot particles, condenses vapors of low boiling liquids from the gases and then separating gas from the first circulating liquid and passing it through a second purifying liquid. Although the invention is concerned only with the apparatus or combination of apparatus involved, it is noted that aqueous liquids and especially aqueous liquids which include alkaline reagents are suitable as the liquids to employ with the system.

SHORT DESCRIPTION OF THE DRAWING

Figure 1:
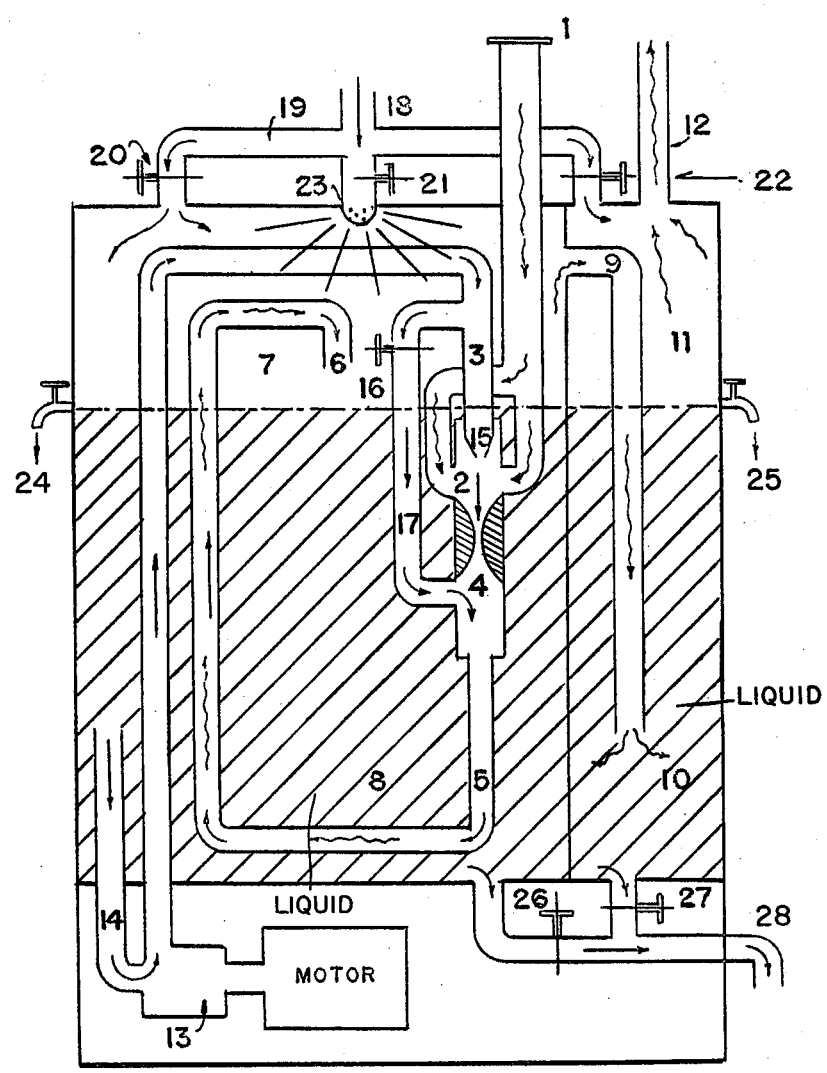
FIG. 1 is a cross-sectional view showing the internal structure of the system.

As it is shown in FIG. 1, soot and residual gases, or soot, or residual gases individually, proceeding from their source, will be sucked through entrance 1, passed to mixer 2 where the residual gases are treated to a liquid coming through duct 3, whereupon vapors of low boiling liquids may condense or be absorbed. Soot and residual gases already condensed continue with liquid mix, passing through the Venture-type constriction 4, continuing through duct 5 as far as the outlet 6, which discharges them all inside enclosed space 7 which is the upper part of tank 8.

Heavier particles of residues being separated, settle in tank 8 while lighter particles remain in the upper part of tank 8. Gases accumulated inside space 7 develop a pressure and pass through duct 9 of the wall between tanks 7, 8 and 10 which duct 9 releases them beneath the liquid level in the lower part of tank 10, where they emerge to space 11 in the upper part of tank 10. Then they escape through duct 12. Gases thus purified are discharged to the open air or are collected, as desired.

The circuit of liquid is as follows: liquid is sucked from tank 8 through duct 14, by pump 13. Then the liquid is forced through duct 3, the orifice in nozzle 15, through mixer 2, continuing through restriction 4, through immerged duct 5, as far as the outlet 6 where said liquid is discharged to enclosed space 7, the liquid falling into tank 8.

Mixer 2 comprises a suction chamber where liquid is injected through a nozzle 15 and mixed with the soot and gases inside chamber 2. (Soot and gases enter from duct 1). The mixture is injected through Venturi-type constriction 4 to proceed through immerged duct 5, where it is discharged into space 7 of tank 8, through outlet 6. The pressure of the liquid at 15 is adjusted by means of a valve 16 in duct 17, which connects duct 3 to duct 5, above restriction 15 and below the restriction 4.

Figure 2:
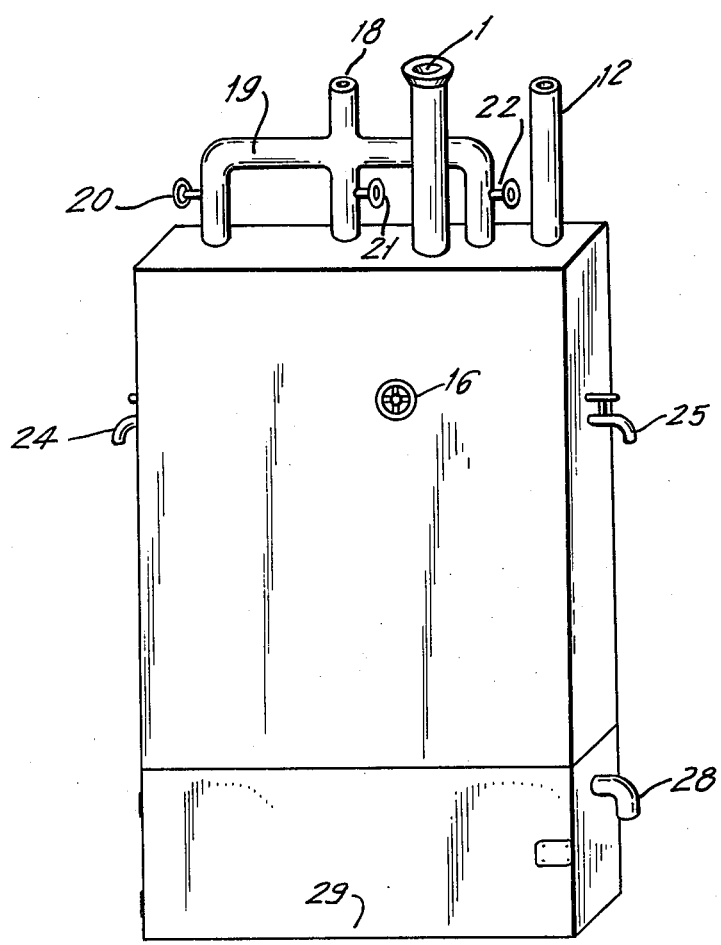
FIG. 2 is an external view of the system.

FIG. 2 shows the external view of the apparatus which comprises a casing which may take a variety of sizes and shapes. The following parts are shown externally: gas entrance 1, pressure setting valve 16, liquid entrance 18, liquid duct 19, supply valve 20 for tank 8, valve 12 to fill auxiliary tank 10, supply valve 24 for checking level inside tank 8, valve 25 for checking level inside tank 10, discharging duct 12, cover 29 for the space wherein pump 13, valve 25 and valve 27 are located and discharge pipe 28.

We claim:

1. A system for removing impurities, including soot from residual gases such as flue and exhaust gases comprising an enclosed tank having a liquid retaining lower portion and a gas holding space above the liquid retaining portion, means for maintaining liquid at a predetermined level in said tank, a Venturi-type suction means having a Venturi-type constricted discharge opening and positioned with the discharge opening below the predetermined liquid level, a first pipe means extending outside the enclosed tank connecting said Venturi-type suction means to a source of residual gas to be purified, said Venturi-type suction means comprising a nozzle constructed and arranged to supply liquid to the constricted opening, pump means including a pipe line for passing liquid from the tank under pressure to the nozzle of the Venturi-type suction means, a second pipe means connecting the discharge opening of the Venturi-type suction means to the gas holding space above the liquid retaining portion, a substantial portion of said second pipe means being immersed in the liquid retaining portion of said tank below the predetermined liquid level.

2. The system as claimed in claim 1 comprising, a second tank adjacent said first tank having a liquid retaining lower portion and an enclosed upper portion having a gas-escape duct, means for feeding gas from the gas-holding space of said first-named enclosed tank to a point within the liquid-retaining portion of said second tank.

3. The system as claimed in claim 2, comprising valve means for feeding fresh treating liquid to said first and second tanks.

4. The system as claimed in claim 1 wherein said Venturi-type suction means comprises a valved pipe line connecting the pipe line upstream of said nozzle to the Venturi device downstream of the constricted discharge opening whereby by-pass a portion of the liquid fed by said pump to said Venturi-type suction means.

* * * * *